(12) United States Patent
Brown et al.

(10) Patent No.: US 7,606,157 B2
(45) Date of Patent: Oct. 20, 2009

(54) APPARATUS AND METHOD FOR COMMUNICATING ARBITRARILY ENCODED DATA OVER A 1-GIGABIT ETHERNET

(75) Inventors: Kevin Brown, Long Beach, CA (US); Richard G Thousand, Ankeny, IA (US)

(73) Assignee: Broadcom Corporation, Irvine, CA (US)

( * ) Notice: Subject to any disclaimer, the term of this patent is extended or adjusted under 35 U.S.C. 154(b) by 839 days.

(21) Appl. No.: 10/748,290

(22) Filed: Dec. 31, 2003

(65) Prior Publication Data

US 2004/0151198 A1  Aug. 5, 2004

Related U.S. Application Data

(60) Provisional application No. 60/464,362, filed on Apr. 22, 2003, provisional application No. 60/450,357, filed on Feb. 28, 2003, provisional application No. 60/441,769, filed on Jan. 23, 2003.

(51) Int. Cl.
*G08C 15/00* (2006.01)
(52) U.S. Cl. .................................. 370/235; 370/230.1
(58) Field of Classification Search ................. 370/412, 370/401, 335, 395.53, 386, 229, 230.1, 252, 370/254, 351, 357, 402, 235, 350, 403, 404, 370/419, 463, 468, 469, 478; 710/305, 37, 710/20, 18, 33, 52, 61, 129; 380/28; 375/286, 375/288
See application file for complete search history.

(56) References Cited

U.S. PATENT DOCUMENTS

| | | | | |
|---|---|---|---|---|
| 5,724,086 A | * | 3/1998 | Mackin et al. | 347/237 |
| 6,081,854 A | * | 6/2000 | Priem et al. | 710/37 |
| 6,275,886 B1 | * | 8/2001 | Levy | 710/313 |
| 6,813,651 B1 | * | 11/2004 | Smith et al. | 710/20 |
| 6,822,946 B1 | * | 11/2004 | Wallace | 370/328 |
| RE39,216 E | * | 8/2006 | Worsley et al. | 370/395.53 |
| 2001/0038641 A1 | * | 11/2001 | Fujimori et al. | 370/468 |
| 2002/0031120 A1 | * | 3/2002 | Rakib | 370/386 |
| 2002/0154640 A1 | * | 10/2002 | Wei | 370/401 |
| 2002/0172290 A1 | * | 11/2002 | Chorpenning et al. | 375/257 |
| 2003/0050782 A1 | * | 3/2003 | Zweig et al. | 704/270 |
| 2003/0065863 A1 | * | 4/2003 | Wyland | 710/305 |
| 2004/0030981 A1 | * | 2/2004 | Watanabe | 714/769 |
| 2004/0039866 A1 | * | 2/2004 | Cheung | 710/305 |
| 2004/0146029 A1 | * | 7/2004 | Tong et al. | 370/335 |
| 2005/0163120 A1 | * | 7/2005 | Tachibana | 370/389 |
| 2005/0216942 A1 | * | 9/2005 | Barton | 725/97 |
| 2005/0254645 A1 | * | 11/2005 | Shippy et al. | 380/28 |

\* cited by examiner

*Primary Examiner*—Aung S Moe
*Assistant Examiner*—Abdullah Riyami
(74) *Attorney, Agent, or Firm*—Sterne, Kessler, Goldstein & Fox PLLC

(57) ABSTRACT

Methods and Systems for transmitting data originating according to a first communications standard over a physical layer using a second communications standard are provided. A data stream is received from a physical transmission medium that uses particular first communications standard. Next, a data type identification (DTID) is appended to each byte in the data stream, thereby creating a technology independent data stream having a particular bit rate. This bit rate is then matched to a different bit rate that corresponds to a second communications standard. The technology independent data stream is then transmitted over a physical transmission medium that uses the second communications standard.

18 Claims, 12 Drawing Sheets

APPARATUS AND METHOD FOR COMMUNICATING ARBITRARILY ENCODED DATA OVER A 1-GIGABIT ETHERNET

CROSS-REFERENCE TO RELATED APPLICATIONS

This application claims the benefit of U.S. Provisional Application Nos. 60/464,362, filed Apr. 22, 2003; 60/450,357, filed Feb. 28, 2003; and 60/441,769 filed Jan. 23, 2003; all of which are incorporated by reference in their entirety.

BACKGROUND OF THE INVENTION

1. Field of the Invention

The present invention is generally related to a data communications system. More specifically, the invention enables data streams using various communication protocols or standards to utilize single transmission medium. In an exemplary embodiment, the invention allows data originating under the IEEE 1394b standard to be transmitted over a data bus using IEEE 802.3, 1000BASE-T physical medium.

2. Related Art

A Universal Serial Bus (USB) is an open and freely licensed serial bus that supports 12 Mbps and up to 63 peripheral devices. It is designed to handle communication between a broad range of devices.

An IEEE 1394b data bus is a complimentary technology with higher bandwidth than the Universal Serial Bus (USB), and is commonly used as a bridge between consumer products and computers. In particular, it is often used to link audio/video and data processing equipment to a personal computer. IEEE 1394b standard defines a data transport bus that supports both asynchronous and isochronous data. The IEEE 1394b data bus includes two sub-layers: (1) a link layer; and (2) physical (PHY) layer, which transmits the encoded output of the link layer. IEEE 1394b data bus operates at a variety of speeds (100 Mbps, 200 Mbps, 400 Mbps, 800 Mbps) but is generally specified to run only up to a distance of 4.5 meters over copper cable. It provides a flexible interconnection that can usually be plugged into any vacant port.

IEEE 802 standards are a set of standards for LAN communications. The 802.3 standards include two sub-layers: (1) a Medium Access Control (MAC) layer; and (2) a Physical layer (PHY). The MAC layer includes specific methods for gaining access to the LAN. IEEE 802.3 standard is for carrier sense multiple access with collision detection (CSMA/CD) that specifies a LAN with a CSMA/CD access method on a bus topology.

1000BASE-T is a physical layer IEEE standard for operating Ethernet LANs on unshielded twisted-pair (UTP) wiring and defines the requirements for sending information at a gigabit-per-second (Gbps). 1000BASE-T specifies such aspects as connector types (typically eight-pin RJ-45), pin connections, voltage levels, and noise requirements. IEEE 802.3 data using 1000BASE-T standard is specified to run over a distance of up to 100 meters of UTP wiring.

Various communication buses, each having their own transmissions standards and physical layer requirements, present challenges to users wishing to integrate various proprietary technologies into a single, seamless, network. One persistent problem lies where two communications buses operate at different speeds (data rates or bit rates). When these buses must share a common transmission medium, the disparate data rates must be precisely matched. What is needed then, is the ability to integrate data originating from a variety of sources, at a variety of speeds, and with a variety of transmission requirements, into a single data stream capable of transmission on common UTP wiring using the modern 1000BASE-T standards.

For example, it would be beneficial to use the faster 1000BASE-T transmission technology and standards to run, for example, an 800 Mbps ("S800") 1394b data, universal serial bus (USB) data, or data from any other type of communications bus, up to 100 meters along UTP wiring. It would also be beneficial to encompass this technology in a single integrated circuit.

SUMMARY OF THE INVENTION

The present invention provides a method and architecture for accepting any arbitrary data stream (for example IEEE 1394b, USB, USB1, or USB2 data) and transmitting it to a 1000BASE-T physical layer for transmission as a 1000BASE-T stream. In an exemplary embodiment, a method and an architecture are disclosed for transmitting an 800 Mbps ("S800") IEEE 1394b data up to 100 meters using 1000BASE-T transmission technology and IEEE 802.3 standards. In an alternate embodiment, a method and architecture are disclosed for transmitting any arbitrarily encoded data stream using 1000BASE-T transmission technology and IEEE 802.3 standards.

In one embodiment a data stream is received from a physical transmission medium that uses particular first communications standard. Next, a data type identification (DTID) is appended to each byte in the data stream, thereby creating a technology independent data stream having a particular bit rate. This bit rate is then matched to a different bit rate that corresponds to a second communications standard. The technology independent data stream is then transmitted over a physical transmission medium that uses the second communications standard.

Also disclosed is a communication apparatus that includes a transmit data type identification (DTID) circuit coupled to an output of a first transmission medium. The transmit DTID generates a technology independent data stream at a first bit rate. The technology independent data stream represents the original data stream from the first transmission medium. A transmit first-in-first-out (FIFO) buffer is coupled to an output of the transmit DTID and an input of a second transmission medium. The transmit FIFO buffer is used to match the bit rate of the technology independent data stream, to a second bit rate used by the second transmission medium. A receive FIFO buffer is coupled to an output of the second transmission medium. The receive FIFO buffer matches the second bit rate back to the first bit rate. A receive DTID circuit is coupled to an output of the receive FIFO buffer for restoring the original data stream from the technology independent data stream.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to illustrate exemplary embodiments of the invention, are incorporated in and constitute a part of this specification, illustrate embodiments of the invention and together with the description serve to explain the principles of the invention. Like numbers refer to like components throughout, and first numeral represents the figure in which that element first appears. In the drawings.

DETAILED DESCRIPTION OF EMBODIMENTS OF THE INVENTION

Reference will now be made in detail to the embodiments of the present invention, examples of which are illustrated in the accompanying drawings. At the outset, it is helpful to describe an exemplary environment in which the invention may be implemented. The invention is described generally as it is used in the exemplary embodiment where it is desired to communicate IEEE 1394b S800 data over a transmission medium using 1000BASE-T standards. One skilled in the art will recognize that the described method and architecture can easily be implemented with any arbitrarily encoded data stream.

Figure 1A:
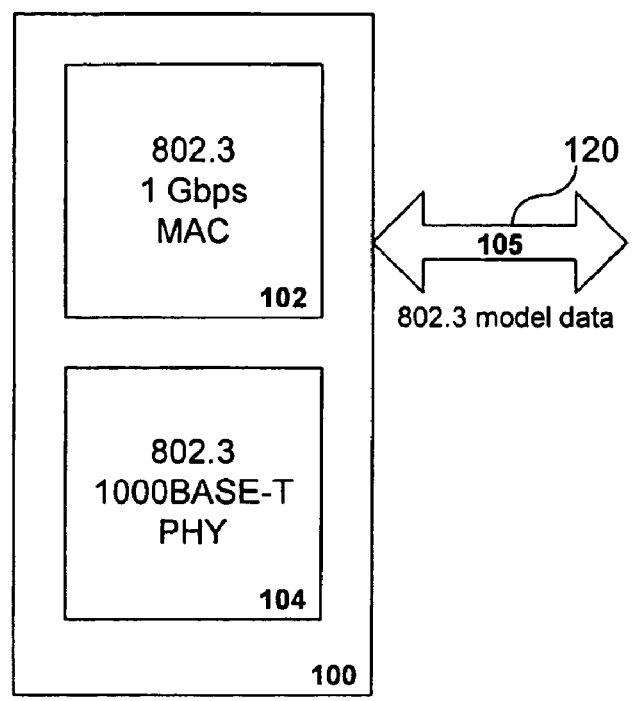
FIGS. 1A and 1B illustrate an operating environment of the invention.
Figure 1A:
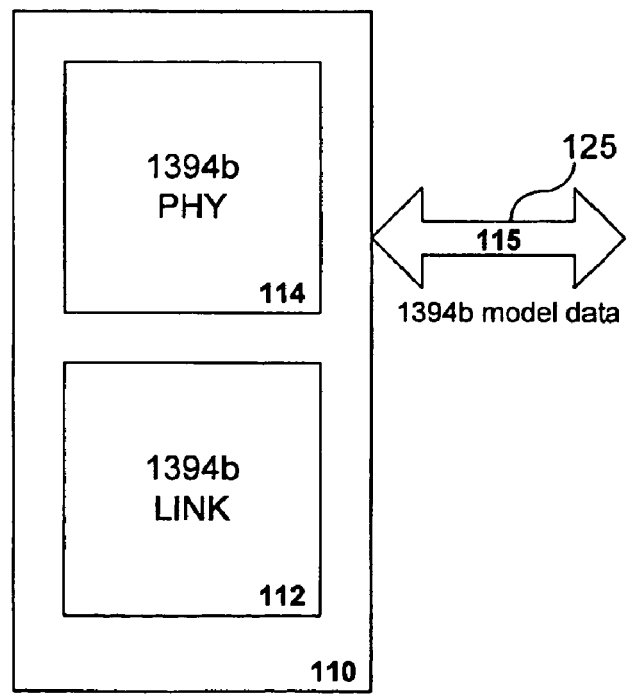

FIG. 1A is a high level block diagram illustrating two exemplary communications buses. A bus using the IEEE 802.3 standard 100 is shown with two sub-layers: (1) a 1 Gbps Media Access Control sub-layer 102; and (2) a 1000BASE-T physical sub-layer 104 (1000BASE-T PHY). The output of the 802.3 standard bus is generally data packets 105 formatted according to 802.3 standard. These 802.3 formatted data packets 105 are transmitted over category 5 unshielded twisted pair (UTP) cable using 1000BASE-T standard over a distance of up to 100 meters at a bit rate of 1 Gbps.

A bus using the IEEE 1394b standard 110 is also shown with two sub-layers: (1) a link sub-layer 112; and (2) a physical sub-layer 114 (1394b PHY). Five speeds are defined in the 1394b standard: 100, 200, 400, 800, and 1600 Mbps. For exemplary purposes, the output of the 1394b standard bus is shown as data packets 115 formatted for 800 Mbps ("S800") transmission. These S800 formatted data packets 115 are typically transmitted over a maximum distance of 4.5 meters over inexpensive copper cable 125, known by its Apple tradename as FireWire cable. (Sony tradename for 1394b products is "I-Link"). It is important to note that the 1394b S800 data is not transmitted at exactly 800 Mbps. Instead, it is transmitted at 786.432 Mbps because the 100 Mbps (S100) speed of the 1394b data bus is actually 98.304 Mbps, while the other speeds, are multiples of S100.

The present invention is a method and architecture that allows 1394b S800 data stream 115, or any other arbitrary data stream, to be transmitted over category 5 UTP cable 120 using 1000BASE-T standard over a distance of up to 100 meters. The invention can be implemented on a single integrated circuit chip.

Figure 1B:
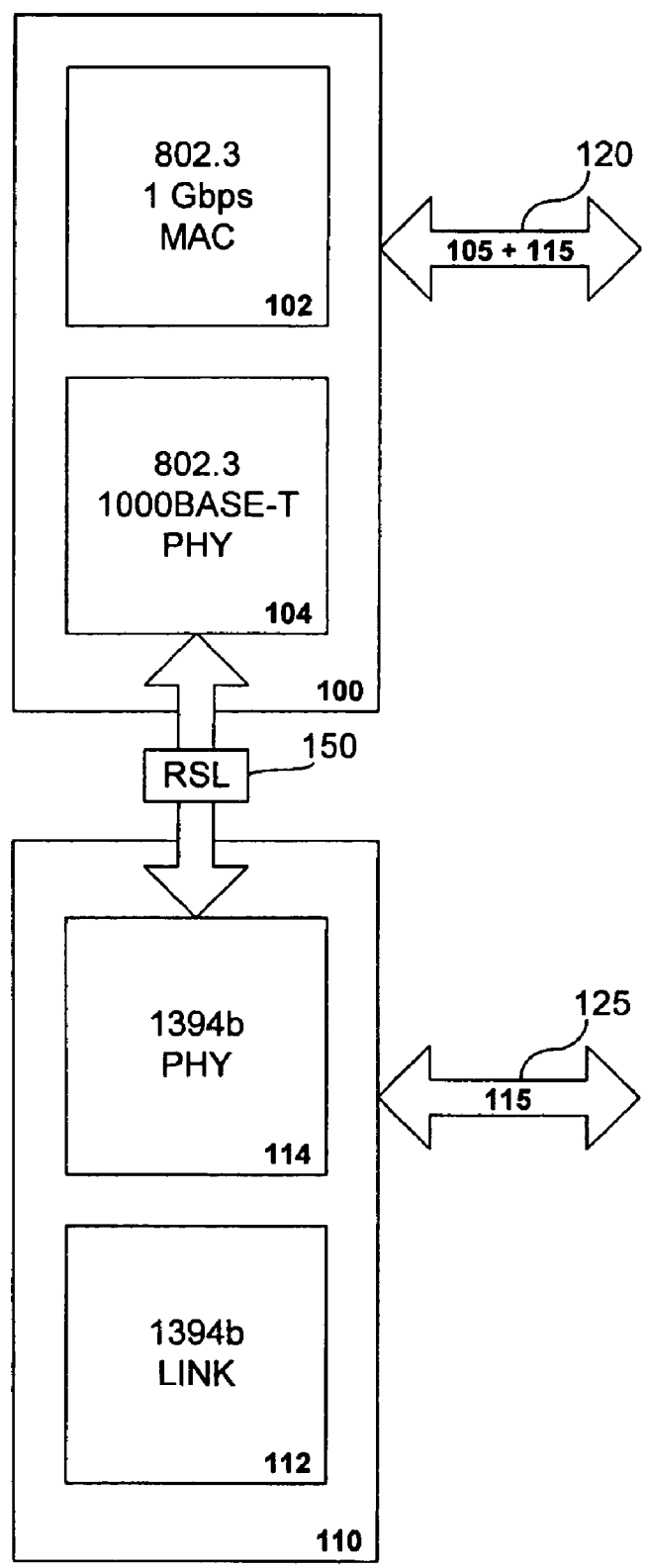

FIG. 1B illustrates an exemplary embodiment of the invention where 1394b data is tapped from the 1394b S800 PHY 114, and passed through a reconciliation sub-layer 150 to the 1000BASE-T PHY 104. The data is then transmitted over category 5 UTP wiring. The 802.3 data and the 1394b S800 data may be transmitted separately, or may be multiplexed and simultaneously transmitted over the same wire using time division multiplexing. Alternatively, the invention could be configured to simultaneously carry one 1394b S800 data stream, and one or two 100 Mbps 802.3 data streams; or one 1394b S800 data stream and one 100 Mbps 802.3 data stream and 1-10, 10 Mbps 802.3 data streams. One skilled in the art could envision alternate combinations of 1394b data streams 115 and 802.3 data streams 105 without departing from the scope and spirit of the invention, as long as the combination adds up to 1000 Mbps or less, which is the speed at which the 1000BASE-T PHY 104 operates.

For example, the 1394b streams 115 may be S100 (100 Mbps), S200 (200 Mbps), S400 (400 Mbps) or S800 (800 Mbps), while the 802.3 data streams may be either 10 Mbps or 100 Mbps. Thus, for example, one 1394b S800 data stream, and 1-20 10 Mbps 802.3 streams; or 2 1394b S400 data streams and one or two 100 Mbps 802.3 data streams; or one 1394b S400 data stream, and one to six 100 Mbps 802.3 data streams.

Figure 2:
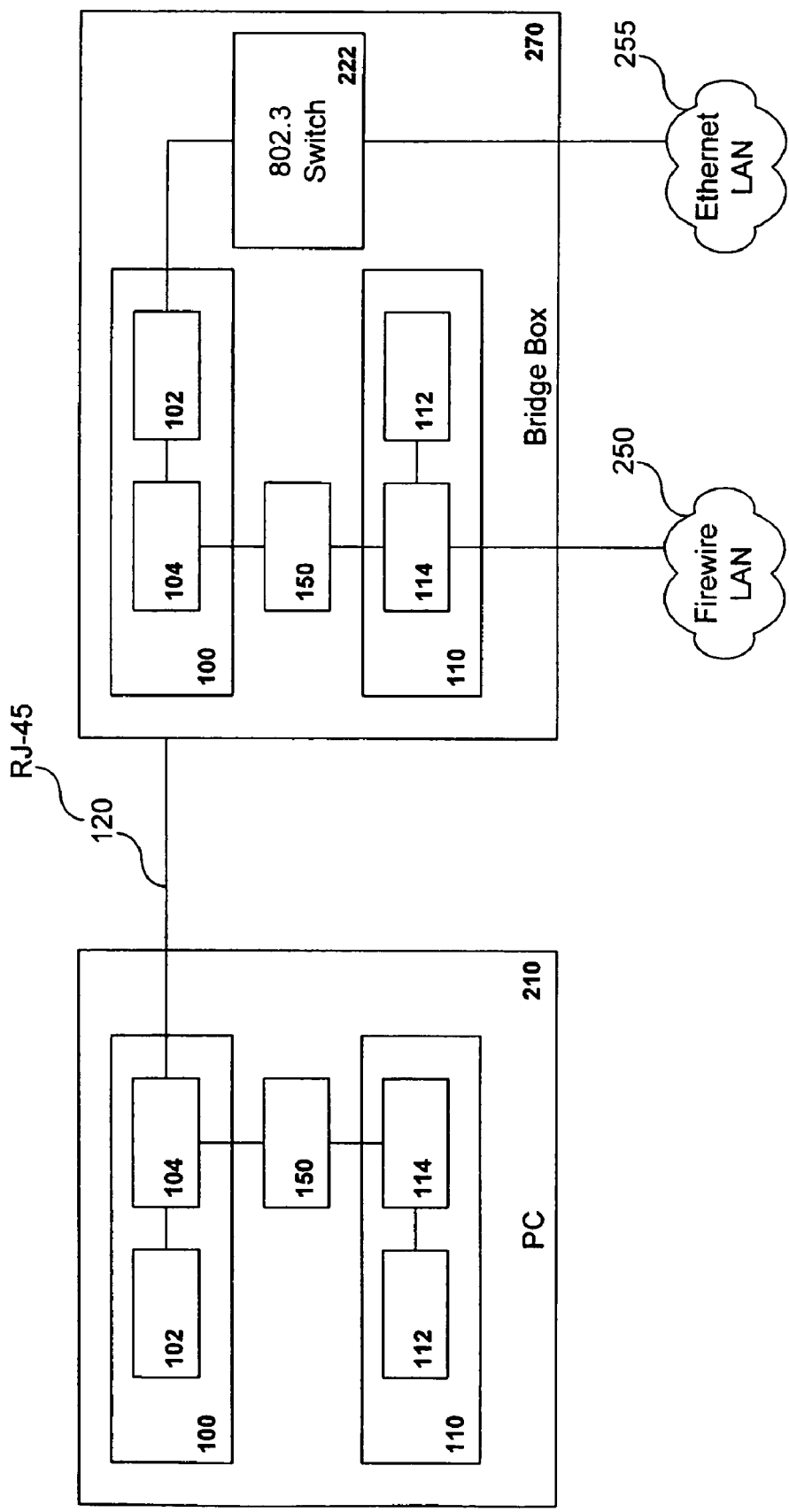
FIG. 2 further illustrates an operating environment of the invention.

FIG. 2 illustrates how the invention may be used in a particular environment. A communications backbone 210 on a personal computer (not shown) uses an embodiment of the invention, which combines the data in 802.3 format with data from peripherals in 1394b S800 format to generate a 1000BASE-T formatted output carrying 802.3 data stream 105, 1394b S800 data stream 115, or a combination thereof. Using time division multiplexing, this data can be sent simultaneously over a single RJ-45 path to a bridge-box 220. Bridge-box 220 allows the data from the PC's RJ-45 120 line to be split and sent to either an Ethernet LAN 255, which uses UTP wiring 120, or a FireWire local network 250, which uses copper cabling 120. Bridge-box 220 can be constructed using off-the-shelf components as will be understood by one skilled in the art based on the discussion herein.

Figure 3:
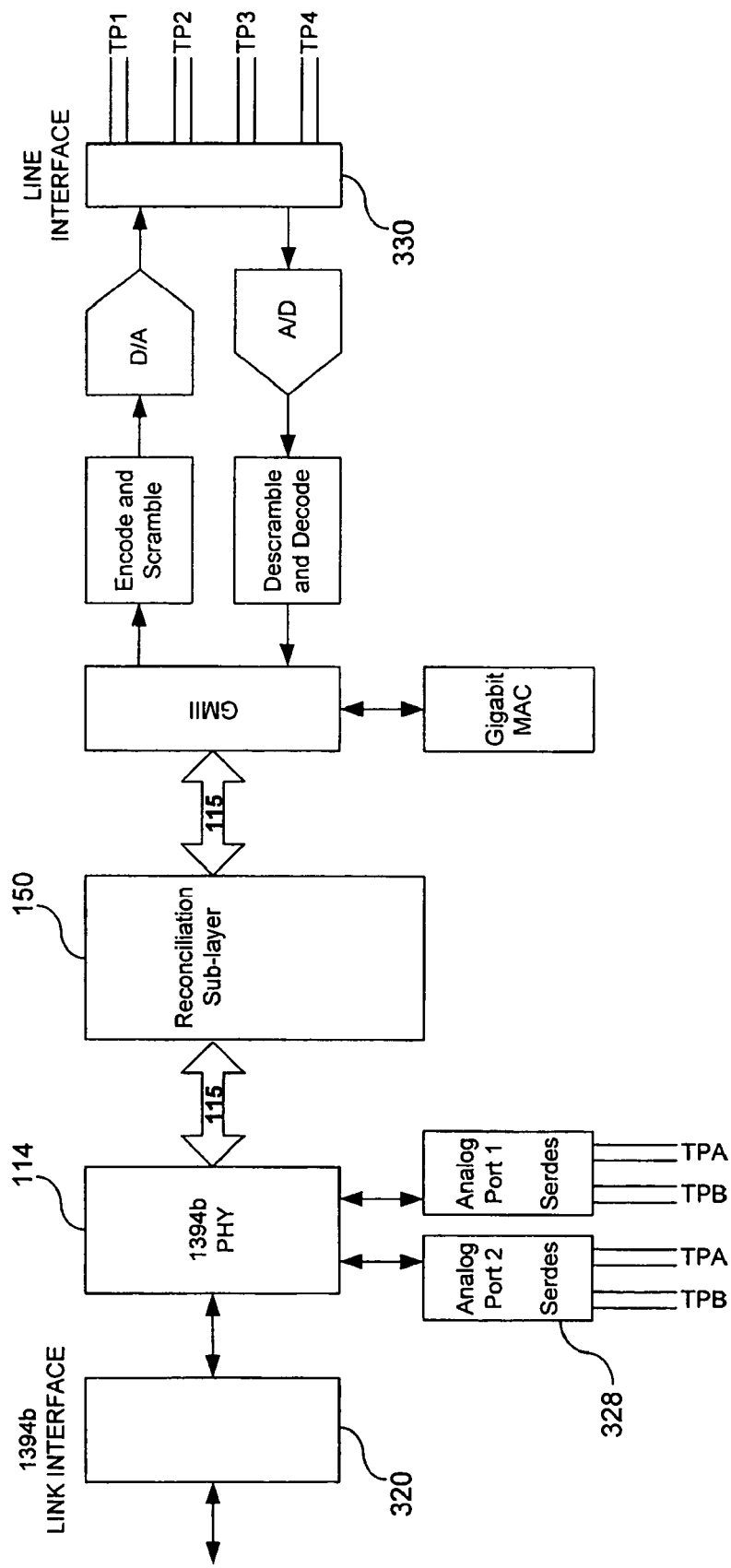
FIG. 3 illustrates how an embodiment of the invention is positioned between the physical sub-layers of two communications buses.

FIG. 3 more specifically illustrates how the reconciliation sub-layer 150 is situated between the 1394b S800 PHY and the 1000BASE-T PHY. The reconciliation sub-layer 150 performs the function of data-rate matching so that, for example, 1394b S800 data can be sent over the faster operational speed 1000BASE-T PHY. This function is more fully described below with respect to FIG. 6. As can be seen in FIG. 3, the 1394b S800 data stream 115 is tapped off before the analog serializer/deserializer (SERDES) ports 328, which are the usual exit ports for the 1394b S800 data stream. The 1394b S800 bit rate is then matched to the 1000BASE-T bit rate by the reconciliation sub-layer 150. The reconciliation sub-layer 150 is coupled to the Gigabit Media Independent Interface (GMII) 310. The GMII serves as an interface between reconciliation sub-layer 150 and the coding and analog-to-digital conversion functions of the 1000BASE-T PHY 104.

Figure 4:
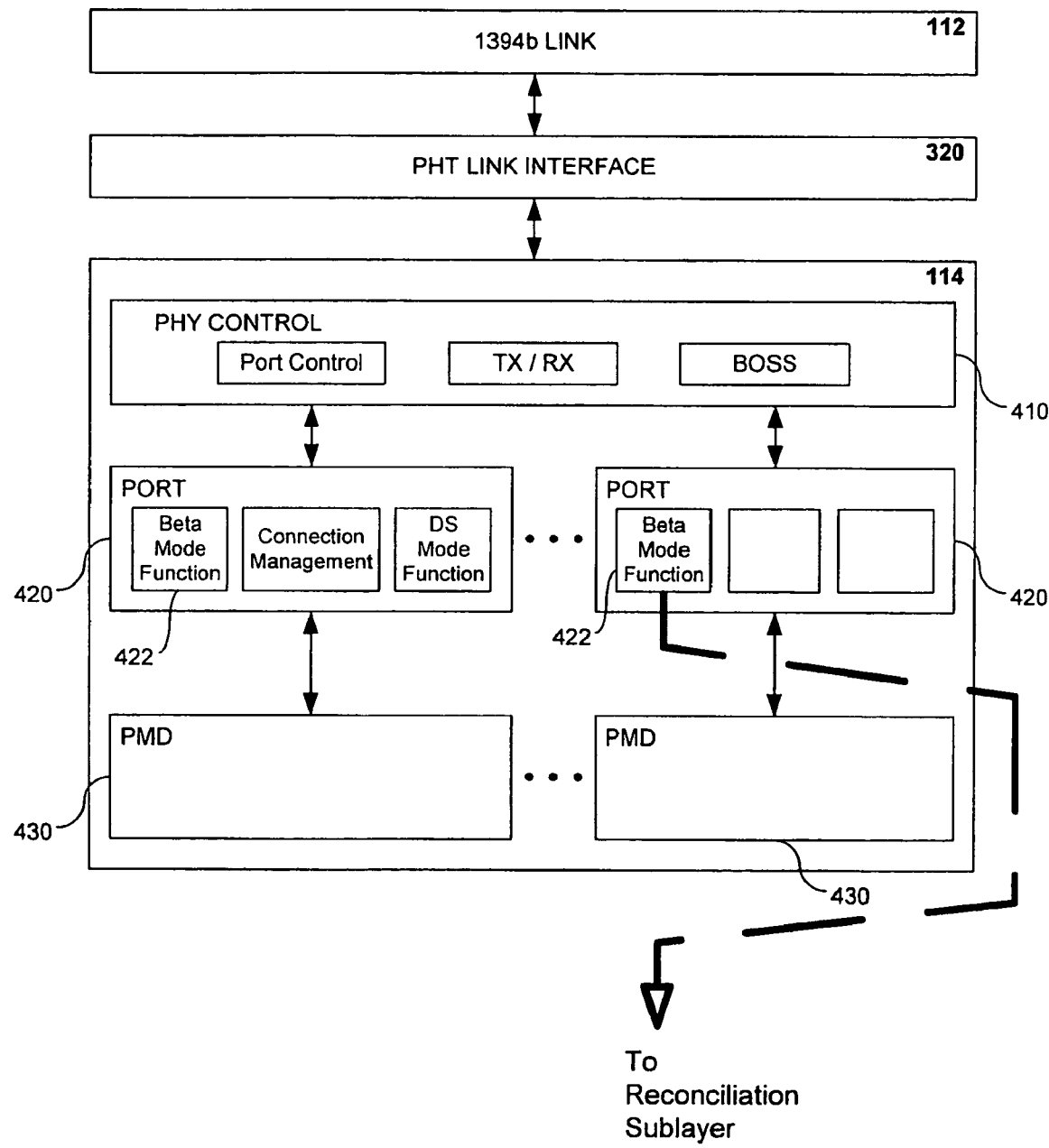
FIG. 4 illustrates from where the invention taps into a physical sub-layer of a communications bus in a particular environment.

FIG. 4 illustrates the master structure of the 1394b S800 PHY 114. This diagram puts in context data routing, arbitration and control interfaces in 1394b S800 PHY 114. More specifically, FIG. 4 depicts where within the 1394b S800 PHY 114 the interface is made with 1000BASE-T PHY 104. As shown, the 1394b S800 data stream 115 is tapped at the beta mode function 422. The 1394b data bus includes the 1394b link layer 112, the PHY link layer interface 320, and the 1394b PHY. The 1394b PHY layer itself has a control circuit 410, a data manipulation circuit 420, and a physical medium dependent (PMD) sub-layer 430. The data manipulation circuit 420 includes beta mode function circuit 422, a connection management circuit 424 and a DS mode function circuit 426.

Figure 5A:
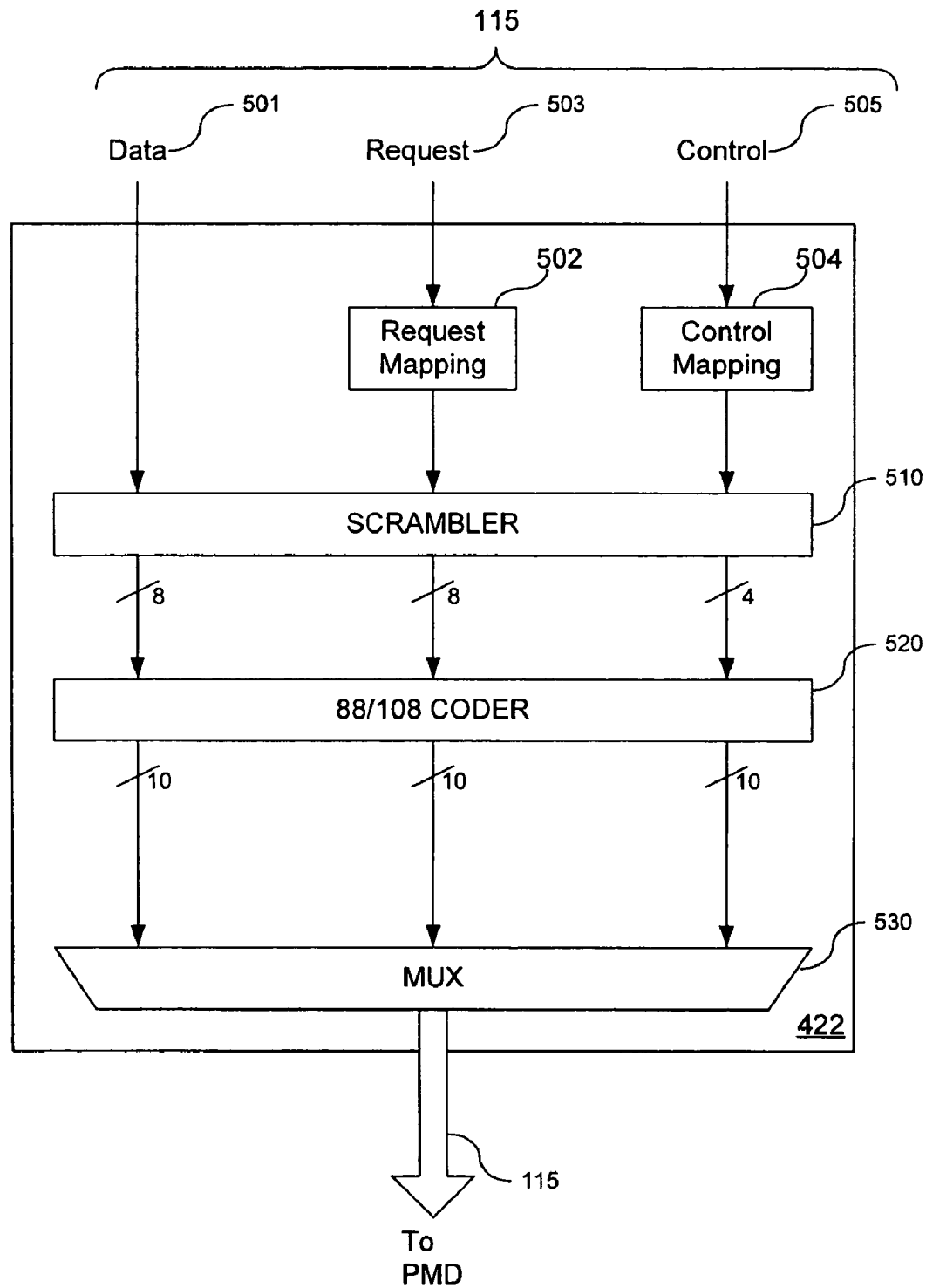
FIGS. 5A and 5B further illustrates from where the invention taps into a physical sub-layer of a communications bus in a particular environment.
Figure 5B:
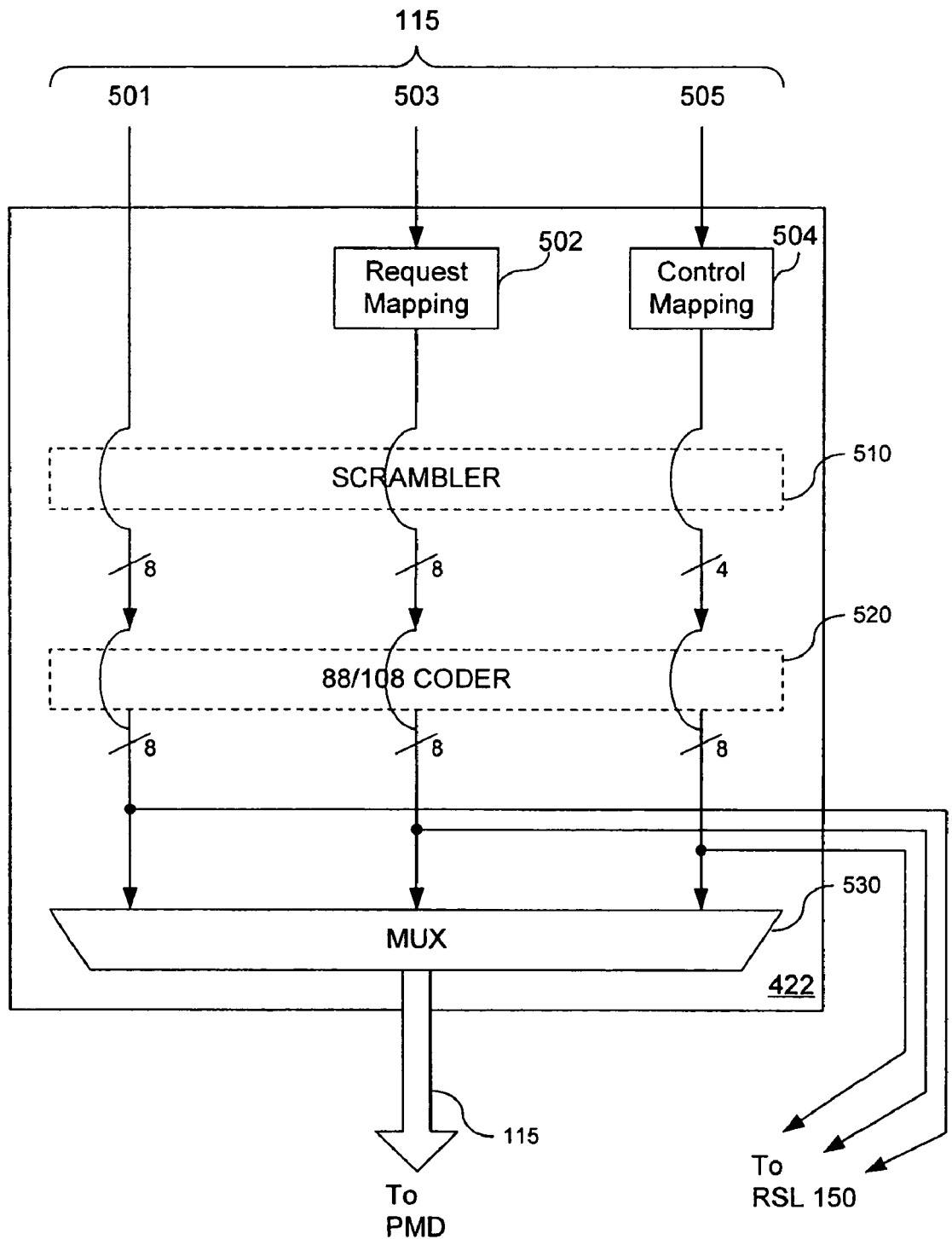

FIGS. 5A and 5B more specifically illustrate where the 1394b S800 data stream 115 is tapped from the 1394b S800 PHY. FIG. 5A illustrates a typical beta mode function block. The 1394b S800 data stream 115 includes data symbols 501, request symbols 503, and control symbols 505. The data symbols 501 and request symbols 503 are 8 bits each, while the control symbols 505 are 4 bits each. The beta mode function scrambles, encodes, and combines the various 1394b S800 data stream symbols and prepares them for transmission on a selected physical medium (PMD). These specific functions are illustrated in FIG. 5A and include request byte mapper 502 and control byte mapper 504, a scrambler 510, an 8B/10B coder 520, and a multiplexer 530. FIG. 5B illustrates a preferred embodiment of the invention where both the scrambler 510, and the 8B/10B encoder 520 are bypassed. The 1394b S800 data stream 115, essentially in raw form, is sent directly in parallel to the reconciliation sub-layer 150 for data rate matching before it is sent on the 1000BASE-T PHY 104.

Figure 6:
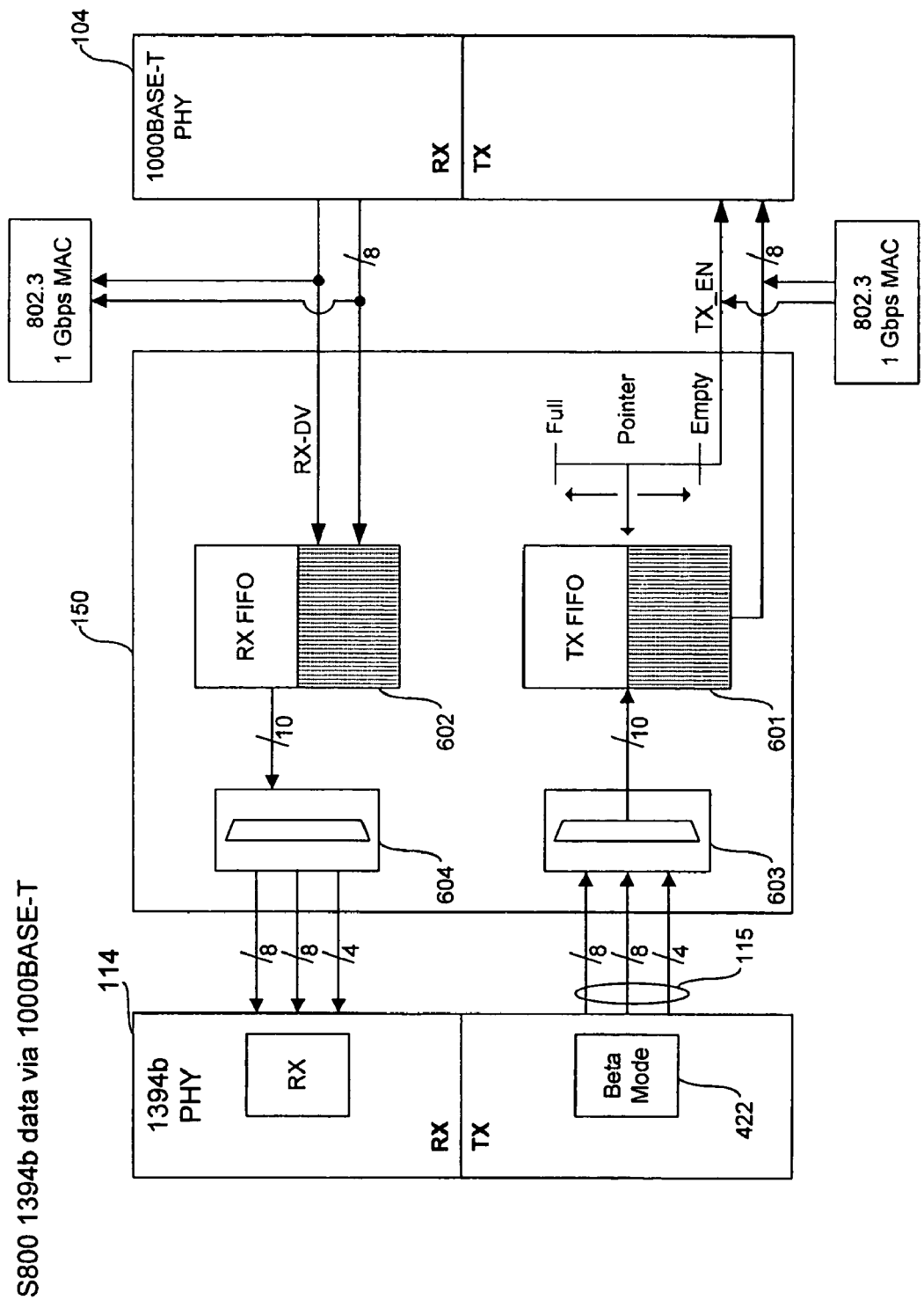
FIG. 6 illustrates a reconciliation sub-layer according to an embodiment of the invention.

FIG. 6 illustrates the reconciliation sub-layer 150 as it operates in the exemplary embodiment where a 1394b S800 data stream 115 is transmitted using the 1000BASE-T PHY. On the transmit side, reconciliation sub-layer 150 includes a transmit data type identification circuit (transmit DTID circuit) 603, a transmit first-in-first-out (FIFO) buffer 601, and a pointer 605 to indicate the status of the transmit FIFO buffer 601. On the receive side, reconciliation sub-layer 150 includes a receive FIFO buffer 602 and a receive data type identification circuit (receive DTID circuit) 604.

Reconciliation sub-layer 150 prepares the 1394b S800 data stream 115 for transmission using the 1000BASE-T PHY. The content of the data stream is not relevant to transmission at the physical layer. Thus, the primary function of reconciliation sub-layer 150 is to precisely match the disparate data rates of the 1394b S800 and 1000BASE-T standards. As noted above, the 1394b S800 standard transmits 8 bit bytes at 786.432 Mbps (786.432 MHz) while the 1000BASE-T standard transmits 8 bit bytes at 1000.0 Mbps (1000.0 MHz). Thus, for the 1394b S800 data stream to be transmitted over the 1000BASE-T PHY, its speed must be increased.

Generally, the data rate matching is achieved in two steps. First, coarse data rate matching is accomplished by appending two bits after each 1394b S800 byte. Then, the transmit FIFO buffer 601 is used to account for the remaining data rate mismatch. These steps are described more fully below.

According to FIG. 6, the parallel, unscrambled, unencoded 1394b S800 data stream 115 is tapped from the beta mode function block 422 of the 1394b S800 PHY 114 and fed to the reconciliation sub-layer 150. The transmit data type identification circuit 603 appends a two bit data type identification (DTID) to both the request symbols 502 and the data symbols 501. In addition to the DTID, four null zero's are also appended to the 1394b S800 control symbols 505. With the DTIDs added to the 1394b S800 data stream, the 10 bit bytes become technology independent data units (TIDUs) and the data stream becomes a technology independent data stream.

Figure 7A:
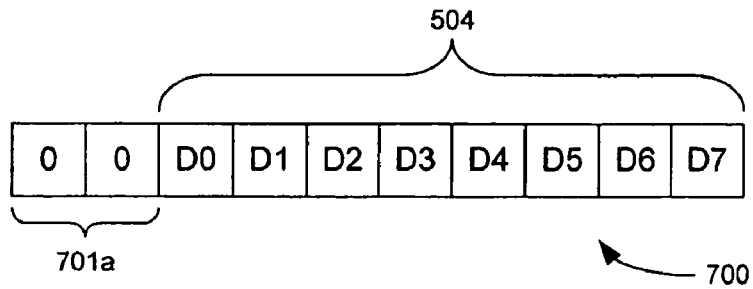
FIG. 7 illustrates the creation of a technology independent data unit (TIDU).
Figure 7B:
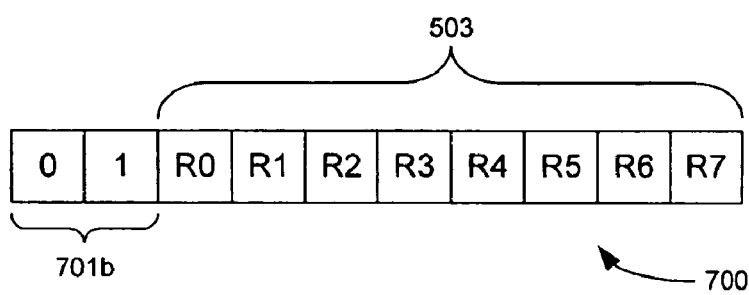
Figure 7C:
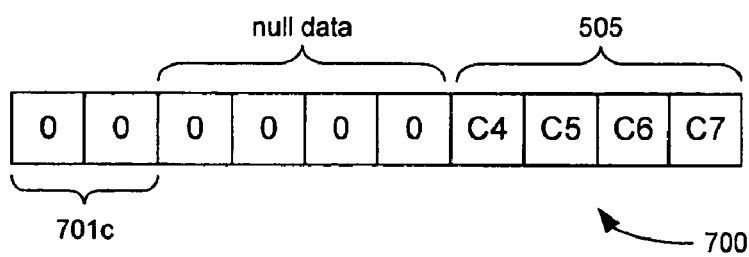
Figure 7D:
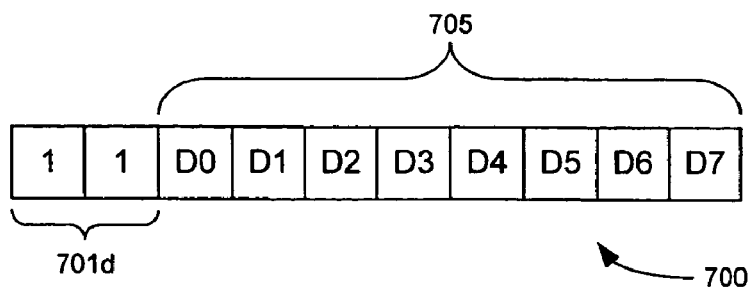

FIGS. 7A through 7D illustrate the creation of a TIDU 700 by addition of a particular DTID 701a-c. In an exemplary embodiment using the IEEE 1394b S800 standards, DTIDs 701a-c are used to identify a class of data field or a data symbol. For example, in FIG. 7A, DTID "00" 701a is appended to a data symbol 501. In FIG. 7B, DTID "00" 701b is appended to request symbol 503. Similarly, in FIG. 7C, DTID "10" 701c is appended to control symbol 505, along with four null data "0's" to bring control symbol 505 up to 10 bits. Alternatively, where other data standards are used (such as 802.3 data or Universal Serial Bus data), DTID "11" 707d may be appended to the data symbol. The addition of the data type identification (DTID) 701a-c thus creates technology independent data unit (TIDU) 700. It should be noted that FIGS. 7A through 7D are shown by way of example and not limitation. One skilled in the art could easily create other TIDUs using a similar method without departing from the spirit and scope of the present invention.

Referring again to FIG. 6, the two bit DTID serves two purposes. First, it is added to identify the 8 bit bytes in the 1394b S800 data stream. Second, the addition of two bits accomplishes coarse bit rate matching. As described above, the 1394b S800 standard transmits 8 bit symbols at 786.432 Mbps (MHz). Appending the two bit DTID to each of the 8 bit symbols thereby increases the bit rate to 983.04 Mbps [786.432+(2/8)786.432)=983.04). This byte stuffing technique thus both accomplishes the coarse data rate matching and creates a technology independent data stream of TIDU's.

Once coarse data rate matching has been accomplished, fine data rate matching remains necessary to bring the 1394b S800 bit rate up to the 1000.0 Mbps of the 1000BASE-T standard. Referring again to FIG. 6, the reconciliation sub-layer 150 includes the transmit FIFO buffer 601, and a pointer 605 for tracking the status of the transmit FIFO buffer 601. The size of the transmit FIFO buffer 601 depends on the difference between the clock rates of the data to be transmitted, and the clock rate of the 1000BASE-T medium. The differences in clock rate between the technology independent data stream and the 1000BASE-T standard (983.04 Mhz vs 1000 Mhz) plus a base clock uncertainty of 400 ppm requires 90 bits of FIFO depth to prevent underflow conditions on a 4800 bit packet size. Preferably, an extra 30 bits of FIFO depth are used for simplicity of design. Thus, in an exemplary embodiment, the transmit FIFO buffer 601 is 120 bits deep. For the same reasons, the receive FIFO buffer 602 is the same size.

Figure 8:
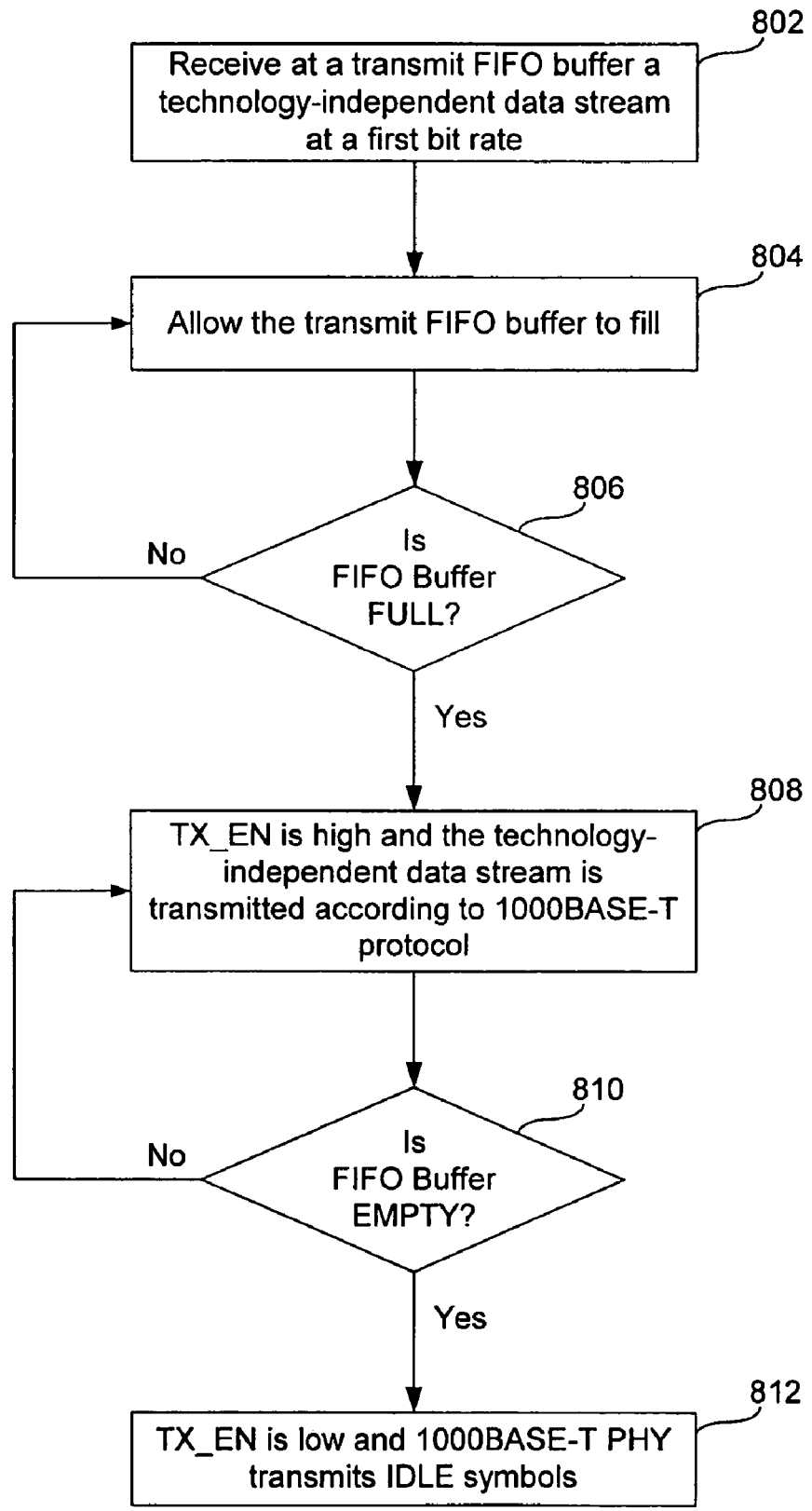
FIG. 8 illustrates the use of a first-in-first-out buffer to match disparate data rates according to the present invention.

FIG. 8 illustrates operation of the transmit FIFO buffer 601 for reconciliation sub-layer 150. The transmit sequence is illustrated using the 1394b S800 standard as an example. The method, however, can be applied to any arbitrary data stream, and is not limited to this example. In the transmit mode, 1394b S800 data is prepared for transmission using the 1000BASE-T standards. In step 802, the transmit FIFO buffer 601 receives the technology independent data stream. In this exemplary embodiment, the technology independent data stream is a stream of 10 bit TIDUs 700 that represent 1394b S800 data stream 115. As described above, the technology independent data stream enters the transmit FIFO buffer 601 at 983.4 Mbps as 10 bit TIDU's. According to step 804, the transmit FIFO buffer 601 is allowed to fill. Filling the transmit FIFO buffer 601 takes approximately 80-88 ns to reach a nearly full state at 983.4 Mbps.

According to steps 806 and 808, when pointer 605 indicates FULL, the transmit enable (TX_EN) goes high, and the technology independent data stream is transmitted according to the 1000BASE-T standards over the 1000BASE-T PHY 104 at 1000.0 Mbps in 8 bit words. At this speed transmit FIFO 601 will empty quicker than it fills with the incoming TIDU stream. Thus, according to steps 810 and 812, when pointer 605 indicates EMPTY, TX_EN goes low and 1000BASE-T physical layer 104 sends an IDLE signal while transmit FIFO 601 refills according to step 804. The IDLE signal remains so long as there is no data to send and/or FIFO does not refill. If there is more data, transmit FIFO 601 refills in approximately 80-88 ns, pointer 605 indicates FULL, TX_EN goes high, and TIDU transmission resumes according to the 1000BASE-T standard.

It will be appreciated that, according to the above described method, the 1394b S800 PHY can send data, request and control signals continuously at the S800 speed (786.432) to the reconciliation sub-layer 150, while the 1000BASE-T PHY alternates between transmitting bursts of 1394b S800 data TIDUs and IDLE signals. The DTIDs become separated from the bytes they identify when the technology independent data stream leaves the transmit FIFO 601. This is because the technology independent data stream enters the transmit FIFO 601 in 10 bit words, and leaves the transmit FIFO in 8 bit words. As explained below, the TIDUs becomes realigned with their respective bytes in the receive portion of reconciliation sub-layer 150.

Referring back to FIG. 6, the receive function of reconciliation sub-layer 150 is illustrated. In the receive mode, reconciliation sub-layer 150 receives data in the form of a technology independent data stream from a 1000BASE-T PHY 104. Receive FIFO buffer 602 works in similar fashion to the transmit FIFO buffer 601 described above, but in the opposite direction. The receive data valid (RX_DV) signal is an output of the 1000BASE-T PHY receiver block, and is an input to the reconciliation sub-layer 150. The 1000BASE-T PHY receiver has the ability to distinguish between IDLE and data symbols in the received path, and outputs RX_DV accordingly. RX_DV thus responds to the nature of the data on the wire. If the incoming stream on the wire is a 1000BASE-T IDLE stream, RX_DV goes low and the reconciliation sub-layer 150 clocks nothing into the FIFO. If the incoming stream on the wire is not IDLE, then RX_DV goes high, and the reconciliation sub-layer 150 clocks the technology independent data stream into the receive FIFO buffer 602 as 8 bits in parallel at 1000.0 Mbps.

The technology independent data stream leaves the receive FIFO as 10 parallel bits at 984.4 Mbps and enters the receive data type identification circuit. The receive data type identification circuit 604 examines the DTID and demuxes the technology independent data stream accordingly. The DTIDs 700 are removed and the unscrambled, unencoded 1394b S800 data stream is fed back to an appropriate place in the 1394b S800 PHY. This allows the technology independent data stream to become realigned so that the DTIDs match up to the bytes to which they were originally attached when they entered the transmit FIFO buffer 601.

It will be appreciated that, according to the above described method, the 1000BASE-T PHY alternates between bursts of data and no data (no input to FIFO 700) while 1394b S800 PHY receives data and control signals continuously at the S800 speed (786.432 Mhz) from the reconciliation sub-layer 150.

Figure 9:
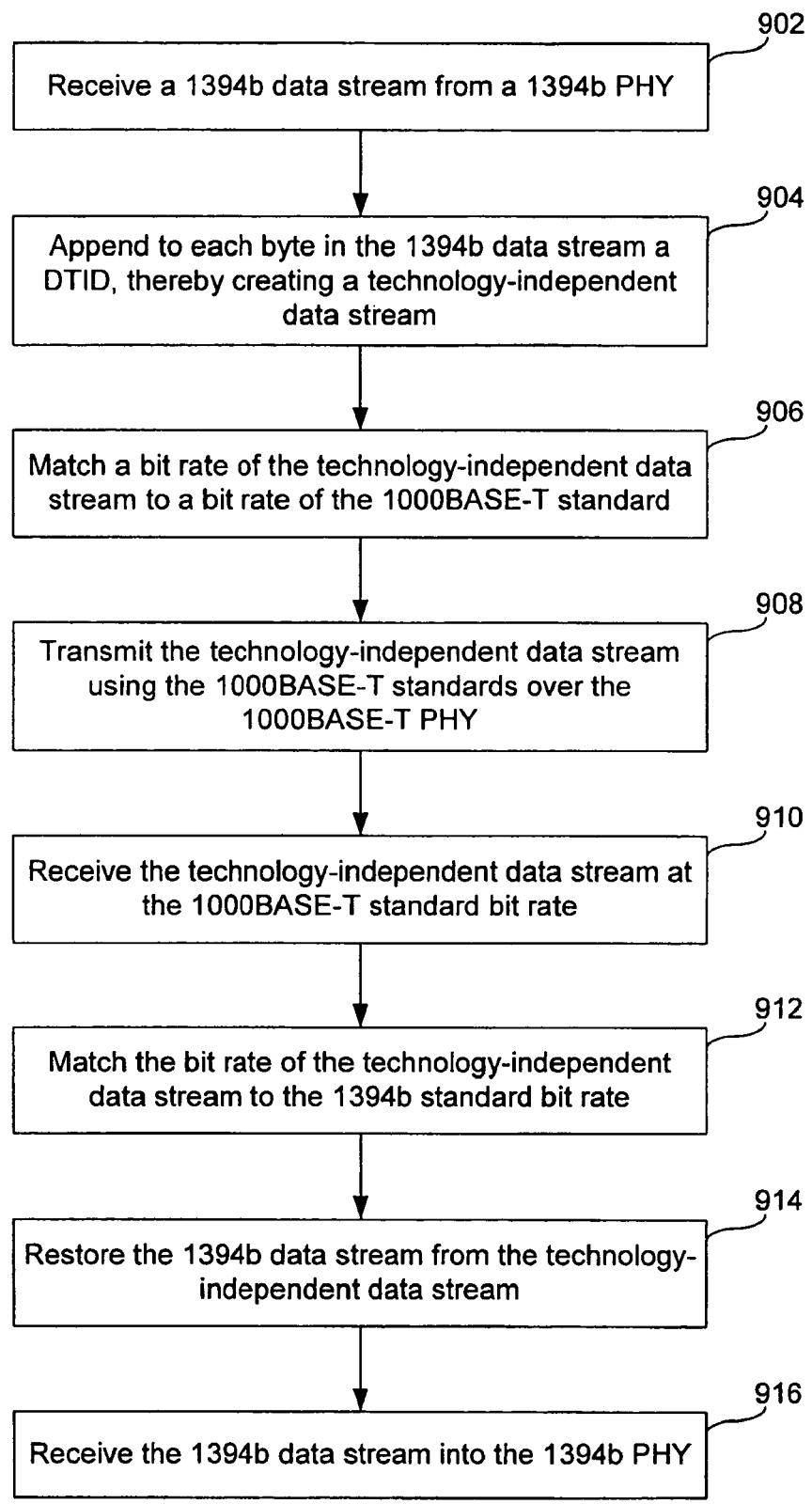
FIG. 9 illustrates the method of the present invention in both the transmit and receive applications.

FIG. 9 illustrates the entire process of transmitting 1394b S800 data using 1000BASE-T standards according to an exemplary embodiment of the present invention. According to step 902, a 1394b S800 data stream is received from a 1394b S800 PHY. As described above, the unscrambled, unencoded 1394b S800 data stream is tapped from the beta mode function of the 1394b S800 PHY layer. The 1394b S800 data stream is received at the reconciliation sub-layer. According to step 904, a 2 bit data type identification (DTID) is appended to each byte of the 1394b S800 data stream 115 depending on the class of data field (e.g., data, request or control). This creates a technology independent data unit (TIDU). The TIDUs are then multiplexed into single data stream, thereby creating a technology independent data stream. The addition of the DTID's in step 904 also serves to coarsely match the bit rate of the technology independent data stream to the bit rate of the 1000BASE-T PHY.

Next, according to step 906, the bit rate of the technology independent data stream is matched to the bit rate of the 1000BASE-T standard. This is accomplished by using the transmit FIFO buffer 603 to buffer the technology independent data stream as it conveyed to the 1000BASE-T PHY. As described below, and according to step 908, the technology independent data stream is transmitted over the 1000BASE-T PHY using 1000BASE-T standards. Thus, in this exemplary embodiment, the technology independent data stream representing the 1394b S800 data stream is transmitted in 8 bit bytes at 1000.0 Mbps over category 5 UTP wiring.

According to step 910, the technology independent data stream is received at the reconciliation sub-layer from the 10000BASE-T PHY at the 1000BASE-T bit rate of 1000.0 Mbps. Next, according to step 912, the bit rate of the 1000BASE-T is matched to the 1394b S800 bit rate. This is accomplished in two steps using the receive FIFO buffer and the receive DTID circuit. The receive FIFO buffer buffers the incoming technology independent data stream such that it leaves the receive FIFO in 10 bit words at 983.4 Mbps. The receive DTID circuit, according to step 914, restores the technology independent data stream to its original unscrambled, unencoded 1394b S800 data stream by stripping off the DTIDs, which were realigned to the 1394b S800 bytes when technology independent data stream left the receive FIFO as 10 bit words. Finally, in step 916, the restored 1394b S800 data stream is received on the 1394b S800 PHY.

The exemplary embodiment presented above illustrates how the reconciliation sub-layer can be used to send IEEE 1394b S800 data, which is ordinarily confined to distances of 4.5 meters on a Firewire network, up to 100 meters over a 1000BASE-T network using category 5 UTP wiring. One skilled in the art(s) would be able to apply similar methods to other communications standards using the flexibility of the technology independent data units.

Figure 10:
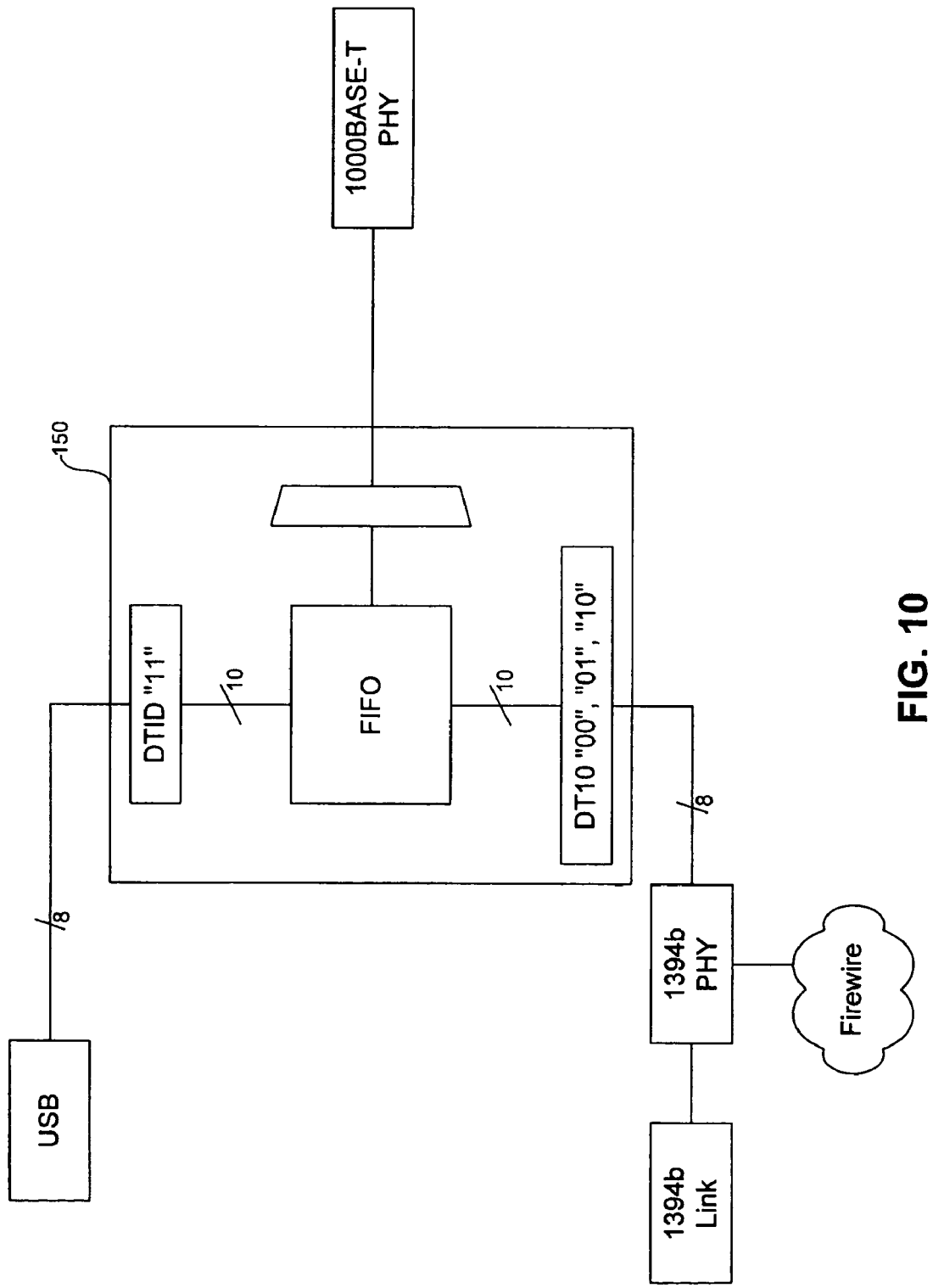
FIG. 10 illustrates an embodiment of the present invention using the transmit side of the reconciliation sub-layer for both universal serial bus data and 1394b S800 data.

For example, FIG. 10 is a block diagram illustrating another embodiment using the transmit side of the reconciliation sub-layer 150 for both universal serial bus (USB) data and 1394b S800 data. In FIG. 10, the two bit DTID "11" is appended to each byte of data from a universal serial bus (USB). If the speed of the USB bus and the 1394b bus were similar, they can share the same transmit and receive FIFO's. If the data rates are not similar, then different FIFO's can be easily constructed and configured.

IEEE 802.3 and IEEE 1394b S800 data can also be combined in a single signal path. For each data stream, a 10 bit TIDU is generated for input to the reconciliation sub-layer. For the 802.3 data, 4-bit nibbles are combined to form 8-bit words. The 2-bit DTID "11" is then appended to the 8-bit word to form the TIDU.

CONCLUSION

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for transmitting data, comprising:
  (a) receiving a first data stream from a first physical transmission medium using a first communications standard sub-layer of an IEEE 1394b data bus including an 8-bit data type;
  (b) appending to each data byte in said first data stream a 2-bit data type identification (DTID), wherein the DTID identifies a class of data associated with the data byte, thereby creating a technology independent data stream having a first bit rate;
  (c) matching said first bit rate to a second bit rate that corresponds to a second communications standard; and
  (d) transmitting said technology independent data stream over a second physical transmission medium using said second communications standard.

2. The method of claim 1, wherein step (c) comprises:
  (i) receiving at a first first-in-first-out (FIFO) buffer said technology independent data stream at said first bit rate;
  (ii) when said first FIFO buffer is full, transmitting said technology independent data stream at said second bit rate according to step (e); and
  (iii) when said FIFO buffer is empty, stopping said transmitting, thereby allowing said FIFO buffer to refill with said technology independent data stream.

3. The method of claim 1, wherein step (a) comprises receiving said first data stream from a physical sub-layer of an IEEE 1394b data bus including an 8-bit data byte, an 8-bit request byte, and a 4-bit control byte.

4. The method of claim 3, wherein step (b) further comprises:
  appending a second 2-bit DTID to each request byte; and
  appending a third 2-bit control DTID and four null bits to each control byte, thereby creating a technology independent data stream that represents said first data stream.

5. The method of claim 1, wherein step (e) comprises transmitting said technology independent data stream over said transmission medium using IEEE 802.3 1000BASE-T standards.

6. The method of claim 5, wherein step (e) comprises transmitting over a category five unshielded twisted pair (UTP) wiring.

7. The method of claim 1, further comprising:
  (e) receiving said technology independent data stream at said second bit rate;
  (f) matching said second bit rate to said first bit rate;
  (g) restoring said first data stream by removing said DTID from each data byte of said technology independent data stream; and
  (h) receiving said first data stream into a third transmission medium using said first communications standard.

8. A communications reconciliation sub-layer, comprising:
  a transmit data type identification (DTID) circuit coupled to an output of a first transmission medium of an IEEE 1394b data bus for appending a 2-bit DTID to each 8-bit data byte in an original data stream, wherein the DTID identifies a class of data associated with the data byte, thereby generating a technology independent data stream at first bit rate that represents the original data stream from said first transmission medium;
  a transmit first-in-first-out (FIFO) buffer coupled to an output of said transmit DTID and an input of a second transmission medium, said transmit FIFO buffer for matching said first bit rate to a second bit rate used by said second transmission medium;
  a receive FIFO buffer coupled to an output of said second transmission medium, said receive FIFO buffer for matching said second bit rate to said first bit rate; and
  a receive DTID circuit coupled to an output of said receive FIFO buffer for restoring said original data stream from said technology independent data stream.

9. The reconciliation sub-layer of claim 8, wherein said transmit FIFO buffer is 120 bits deep.

10. The reconciliation sub-layer of claim 8, wherein said transmit FIFO buffer is coupled to a pointer for indicating a status of said transmit FIFO buffer.

11. The reconciliation sub-layer of claim 8, wherein said original data stream comprises unencoded, unscrambled 1394b data from a physical sub-layer of said IEEE 1394b data bus.

12. The reconciliation sub-layer of claim 11, wherein said unencoded, unscrambled 1394b data is tapped from a beta mode function circuit of said IEEE 1394b data bus.

13. The reconciliation sub-layer of claim 8, wherein said second transmission medium is an IEEE 802.3 1000BASE-T data bus.

14. The reconciliation sub-layer of claim 8, wherein said first transmission medium is a universal serial bus.

15. A communications sub-layer for transmitting data formatted according to a first communications of an IEEE 1394b standard over a physical medium designed for data formatted according to a second communications standard, comprising:
  means for receiving a first data stream formatted according to the IEEE 1394b standard including an 8-bit data byte;
  means for appending a 2-bit data type identification to each data byte in said first data stream, wherein the data type identification identifies a class of data associated with the byte, thereby creating a technology independent data stream from said first data stream, said technology independent data stream having a first bit rate;
  means for matching said first bit rate to a second bit rate corresponding to the second communications standard; and
  means for transmitting said technology independent data stream over the physical medium according to the second communications standard.

16. The communications sub-layer of claim 15, further comprising:
  means for receiving said technology independent data stream;
  means for matching said second bit to said first bit rate;
  means for restoring said first data stream from said technology independent data stream.

17. The communications sub-layer of claim 15, wherein said restoring means comprises removing said data type identification from each data byte of said technology data stream.

18. The communications sub-layer of claim 16, wherein said matching means uses a first-in-first-out buffer.

* * * * *

UNITED STATES PATENT AND TRADEMARK OFFICE
CERTIFICATE OF CORRECTION

| | | |
|---|---|---|
| PATENT NO. | : 7,606,157 B2 | Page 1 of 1 |
| APPLICATION NO. | : 10/748290 | |
| DATED | : October 20, 2009 | |
| INVENTOR(S) | : Brown et al. | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 839 days.

Delete the phrase "by 839 days" and insert -- by 1100 days --.

At column 9, line 16, replace "type" with -- byte --.

Signed and Sealed this

Thirty-first Day of August, 2010

David J. Kappos
*Director of the United States Patent and Trademark Office*